US008577057B2

(12) United States Patent
Theverapperuma et al.

(10) Patent No.: US 8,577,057 B2
(45) Date of Patent: Nov. 5, 2013

(54) DIGITAL DUAL MICROPHONE MODULE WITH INTELLIGENT CROSS FADING

(75) Inventors: Lalin S Theverapperuma, Allentown, PA (US); Darcy Zehnder, Famington, MN (US); Steve Parker, Owatonna, MN (US); Talal Aly-Youssef, Deephaven, MN (US)

(73) Assignee: Robert Bosch GmbH, Stuttgart (DE)

( * ) Notice: Subject to any disclaimer, the term of this patent is extended or adjusted under 35 U.S.C. 154(b) by 402 days.

(21) Appl. No.: 12/917,711

(22) Filed: Nov. 2, 2010

(65) Prior Publication Data

US 2012/0106753 A1 May 3, 2012

(51) Int. Cl.
*H04B 15/00* (2006.01)

(52) U.S. Cl.
USPC ........ 381/94.5; 381/94.1; 381/94.7; 381/123; 381/122

(58) Field of Classification Search
USPC ........ 381/92, 93, 94.1, 94.5, 94.6, 94.7, 94.9, 381/91, 26, 71.1, 71.6, 71.7, 123, 110, 122, 381/109, 95, 97, 98, 102, 104, 56, 57, 381/71.11, 71.12, 71.13; 341/144, 151, 341/155, 157, 162; 700/94; 379/167.04, 379/93.03, 268, 269, 159, 15.01, 16, 17, 379/22.08, 392.01
See application file for complete search history.

(56) References Cited

U.S. PATENT DOCUMENTS

| | | | | |
|---|---|---|---|---|
| 4,947,440 | A | 8/1990 | Bateman et al. | |
| 5,251,263 | A * | 10/1993 | Andrea et al. | 381/71.6 |
| 5,894,523 | A | 4/1999 | Freeman | |
| 6,549,586 | B2 | 4/2003 | Gustafsson et al. | |
| 6,888,949 | B1 | 5/2005 | Vanden Berghe et al. | |
| 7,050,966 | B2 | 5/2006 | Schneider et al. | |
| 7,092,529 | B2 | 8/2006 | Yu et al. | |
| 7,246,058 | B2 | 7/2007 | Burnett | |
| 7,689,233 | B2 | 3/2010 | Cao et al. | |
| 8,009,843 | B2 * | 8/2011 | Akino | 381/113 |

(Continued)

FOREIGN PATENT DOCUMENTS

| | | | |
|---|---|---|---|
| EP | 0 974 106 | B1 | 1/2007 |
| WO | WO 9810355 | A1 | 3/1998 |

*Primary Examiner* — Vivian Chin
*Assistant Examiner* — Leshui Zhang
(74) *Attorney, Agent, or Firm* — Keith Swedo; Taft Stettinius & Hollister LLP

(57) ABSTRACT

A method of operating a microphone system includes providing first and second microphones associated with a same human speaker. An analog ambient noise signal is received from the first microphone. An analog speech signal is received from the second microphone. The analog ambient noise signal is converted into a digital ambient noise signal. The analog speech signal is converted into a digital speech signal. Digital noise cancellation is performed on the digital speech signal dependent upon the digital ambient noise signal. The digital noise cancellation is performed by digital circuitry. The noise canceled digital speech signal is inputted into an intercom system. A low power condition of the microphone system and/or a failure of the digital circuitry is sensed. In response to the sensing step, an analog-based intercom signal is inputted into the intercom system. The analog-based intercom signal is dependent on the analog speech signal and substantially independent of the analog ambient noise signal. The analog-based intercom signal is inputted into the intercom system without noise cancellation having been performed on the analog-based intercom signal.

19 Claims, 5 Drawing Sheets

(56) References Cited

U.S. PATENT DOCUMENTS

| | | | |
|---|---|---|---|
| 2002/0118848 | A1 | 8/2002 | Karpenstein |
| 2002/0198705 | A1 | 12/2002 | Burnett |
| 2003/0198357 | A1 | 10/2003 | Schneider et al. |
| 2003/0202341 | A1 | 10/2003 | McClanahan |
| 2003/0223592 | A1 | 12/2003 | Deruginsky et al. |
| 2004/0240679 | A1 | 12/2004 | Kennedy et al. |
| 2005/0058300 | A1 | 3/2005 | Suzuki et al. |
| 2005/0272407 | A1 | 12/2005 | Kayamori |
| 2009/0316916 | A1 * | 12/2009 | Haila et al. .................... 381/57 |
| 2010/0142730 | A1 | 6/2010 | Lindahl et al. |

* cited by examiner

200

300

DIGITAL DUAL MICROPHONE MODULE WITH INTELLIGENT CROSS FADING

BACKGROUND

1. Field of the Invention

The present invention relates to microphones, and, more particularly, to microphones that may be included in audio headsets, such as headsets that may be used within an aircraft during flight.

2. Description of the Related Art

Traditionally, microphones are included in wired headsets, such as headsets that are used within aircrafts by pilots, passengers, and others inside the plane. Such headsets are also used by football coaches to communicate instructions and plays during the course of the football game. Both airplanes and football games are generally noisy environments, and the background noise makes it difficult for the listener to clearly hear what the wearer of the headset is saying. Of course, such background noise is also a problem for hand microphones that are not used in headsets. For instance, a speaker, singer or musician may use a hand microphone when addressing a crowd of thousands of people, and often such a large crowd creates a lot of background noise.

Microphones systems utilizing digital signal processing techniques can remove noise and suppress unwanted background sounds that a traditional microphone otherwise would suffer. These microphones can cancel undesired background noise up to 20-24 dB. These noise suppressions result in cleaner audio signals at the pre-amplifier or far end listener in the case of communication microphones. However, the critical communication headsets (including microphone modules) demand that the microphone be activated instantaneously to in order to communicate voice. This requirement arises due to mission-critical usage scenarios of these microphone modules, such as in military situations, aircrafts, and many critical and emergency facilities.

Digital noise canceller microphones include digital signal processors (DSPs) and complex electronics, and thus such microphones can suffer from reliability issues due to the failure of partial systems. These failures are mainly due to the large number of failure modes associated with the many components and complex signal processing algorithms used in these modules. Analog microphone modules, in comparison, are relatively simple and reliable. Thus, these reliability issues present new challenges in the design of microphones that use digital signal processing techniques.

Digital microphones have other disadvantages in comparison to analog microphones. Specifically, digital noise cancellation microphones typically take a longer time to turn on than analog microphones due to the boot loading time of firmware and power-on self verification times of the microprocessor or digital signal processor chips. In addition, digital noise canceling microphones may consume more power than their analog counterparts.

Communication microphones are used mainly for two-way communications in conjunction with an intercom system. In traditional communication systems, speech signals are picked up by an analog microphone and passed into an intercom system. The intercom interface can be a stand-alone unit or may take the form of a belt pack or a telephone interface.

Microphones pick up speech as well as noise signals within the frequency range of the microphone. This noise gets added to the speech or other wanted signals and degrades the quality of the audio signal. With digital signal processing techniques, however, noise components can be removed, leaving only the wanted speech signal unchanged. These techniques are needed when the background noise levels are relatively high. In typical digital microphone noise cancellation systems, two microphones are used. One microphone is used as a noise microphone, and the other microphone is used as a speech microphone.

With the noise source being a relatively far-fielded signal, both the noise microphone and the speech microphone experience a similar transfer function in response to the noise sources. In contrast, the speech source is physically closer to the speech microphone, and thus the speech microphone and noise microphone experience different transfer functions in response to the speech sources. Thus, the two microphones may pick up the noise signal source similarly, but the speech signal source being closer to one microphone can result in different speech transfer functions in the two microphones.

Digital dual microphone noise cancellation has been used in many communication systems based on the principal of identifying the two microphones' transfer functions for the speaker source and for the noise source. The microphone module may also use spectral subtraction techniques to remove common noise components. The noise reduction is achieved by suppressing the effect of noise on the magnitude spectrum only. The subtraction process is performed in power terms or true magnitude terms depending upon the ambient noise source. The important point is that phase terms are ignored for practical reasons in that phase has limited influence on the result. A built-in voice activity detector (VAD) is used to distinguish the speech segments from the noise segments. This distinction is used for proper tuning of the subtracting stage.

Cross-fading algorithms are a known technique to mix two or more audio signals without audible pops, glitches or hard audible clicks being created as artifacts. In simplest form, cross-fading involves the use of two volume controls. One volume control is used to reduce the volume of one audio signal, while the other volume control is used to increase the volume of the other audio signal, with the total volume of the two signals remaining constant.

The boot up time of the digital microphone system may take up to about one full second, and, in critical communication microphones, this delay can result in loss of valuable information. Modern DSPs and microcontrollers use firmware to perform algorithm operations. The firmware gets loaded from a memory module that is connected to the system via a bus. This loading of an instruction sequence to the DSP or microcontroller takes a considerable length of time. In addition, these DSPs and microcontrollers take time to check power during self diagnostic operations and startup operations. Even after the system has started operating, additional time is required for the input and output buffers to be filled in order for the algorithms to effectively remove noise from the input signals.

What is needed in the art is a microphone system that avoids the above-mentioned problems and disadvantages.

SUMMARY OF THE INVENTION

The present invention is directed to a digital microphone that may be able to move into an analog only mode in the event of a failure of the digital system. In the event of an algorithm failure, a watchdog timer may instruct the microcontroller to cross-fade the digital signal to an analog only path without any audio clicks or pops. As a result of this process, the microphone user may lose only the noise cancellation feature as the system switches back into the analog only mode. The analog microphone circuit may consume only a very small fraction of the power consumed by the digital noise cancellation-based microphone system. If the user wishes to operate the unit in this extremely low power mode, the inventive system is able to switch back and forth between the digital mode and the analog mode without any artifacts. The cross-fading circuit may shift between the analog only path and the digital path without any audible artifact. The digital boom microphone module may include an omnidirectional microphone and a directional microphone. At startup, or when the push-to-talk button is pressed, the analog signal path may be activated and the speech signal may be pre-amplified and delivered to the intercom input. The digital volume controlling cross-faders may be set to pass this signal at the startup. Concurrently, the DSP may boot up and initiate the signal processing routine. The signal processing routine may capture signals from the microphones and perform routines to eliminate ambient noise. The far microphone signal consists of mostly ambient noise and the near microphone signal is mostly speech. After both signals pass through the A/D converting and discrete Fourier transform (DFT) modules, the signals may enter the adaptive transfer function identification and frequency domain noise cancellation based on spectral subtraction modules. These modules may precondition and eliminate the ambient noise on the near microphone signal based on the far microphone signal. The output from these modules may be converted to an analog signal by a D/A converter. Once the noise canceller routine is active, the analog only path may be cross-faded by the DSP output into the digital volume controller module to change over into the noise canceling mode. In the event of digital system failure, the watchdog system may trip and the digital audio signal may fade, be powered down, or be moved to the analog only path. The method of the invention may facilitate near-instantaneous start up time and thereafter superior noise cancellation. The output after the volume controlling stage may be impedance matched to suit the intercom system.

The present invention provides a critical communications headset microphone boom that may cancel loud ambient noise in order to improve user communications. This may be accomplished by the digital microphone module of the invention which implements intelligent cross-fading. This digital microphone boom invention may provide four distinct benefits. First, the system may be operational on push to talk onset. That is, the invention may provide instantaneous voice communications during startup. Second, there may be fall-back to analog pass through in the event of digital system failure. Thus, the system of the invention may be failsafe for algorithm or signal processor failure. Third, the system has extremely low power usage when in the analog only mode. Fourth, the invention provides smooth audio cross-fading, including blending of digital and analog audio, while transitioning to/from analog mode or digital noise canceller mode without creating audible clicks/pops artifacts.

In addition to solving the above-described problems of the prior art, as mentioned immediately above, this invention also eliminates the problem of the presence of a ticking sound artifact when switching from the digital mode to the analog mode. More particularly, the invention may eliminate this problem by using a digital microphone module with an intelligent voice activity-detecting cross-fading system.

In a specific embodiment, the present invention provides a microphone system that performs noise cancellation in a digital mode of operation and switches to an analog mode of operation in the event of either a low power condition or a failure in the operation of the digital mode.

The invention comprises, in one form thereof, a method of operating a microphone system, including providing first and second microphones associated with a same human speaker. An analog ambient noise signal is received from the first microphone. An analog speech signal is received from the second microphone. The analog ambient noise signal is converted into a digital ambient noise signal. The analog speech signal is converted into a digital speech signal. Digital noise cancellation is performed on the digital speech signal dependent upon the digital ambient noise signal. The digital noise cancellation is performed by digital circuitry. The noise canceled digital speech signal is inputted into an intercom system. A low power condition of the microphone system and/or a failure of the digital circuitry is sensed. In response to the sensing step, an analog-based intercom signal is inputted into the intercom system. The analog-based intercom signal is dependent on the analog speech signal and substantially independent of the analog ambient noise signal. The analog-based intercom signal is inputted into the intercom system without noise cancellation having been performed on the analog-based intercom signal.

The invention comprises, in another form thereof, a method of operating a microphone system, including providing first and second microphones associated with a same human speaker. An analog ambient noise signal is received from the first microphone. An analog speech signal is received from the second microphone. The analog ambient noise signal is converted into a digital ambient noise signal. The analog speech signal is converted into a digital speech signal. Digital noise cancellation is performed on the digital speech signal dependent upon the digital ambient noise signal. The digital noise cancellation is performed by digital circuitry. The noise canceled digital speech signal is inputted into an intercom system. A need to provide input to the intercom system without using the digital circuitry is sensed. In response to the sensing step, it is ascertained when a volume level of the noise canceled digital speech signal is below a threshold level. In response to the ascertaining step, cross-fading is performed from the noise canceled digital speech signal to an analog-based signal that is dependent on the analog speech signal and substantially independent of the analog ambient noise signal. The cross-fading produces a cross-faded intercom signal. The cross-faded intercom signal is inputted into the intercom system.

The invention comprises, in yet another form thereof, a method of operating a microphone system, including providing first and second microphones associated with a same human speaker. Upon startup of the system, while digital circuitry is being initialized, an analog ambient noise signal is received from the first microphone. An analog speech signal is received from the second microphone. An analog-based intercom signal is inputted into an intercom system dependent on the analog speech signal and substantially independent of the analog ambient noise signal. The analog-based intercom signal is input into the intercom system without noise cancellation having been performed on the analog-based intercom signal. After the startup has been completed and the digital circuitry has been initialized, the analog ambient noise signal is converted into a digital ambient noise signal. The analog speech signal is converted into a digital speech signal. Digital noise cancellation is performed on the digital speech signal dependent upon the digital ambient noise signal. The digital noise cancellation is performed by the digital circuitry. The noise canceled digital speech signal is inputted into the intercom system.

An advantage of the present invention is that, in the event of loss of battery power, the digital microphone is able to revert back to an analog only mode to be used in extremely low power scenarios wherein the microphone module is powered by only the microphone bias circuits of the intercom.

Another advantage is that the invention may provide instantaneous voice communications during startup. In comparison, prior art digital noise cancellation microphones take longer to power up or to be available for voice communications. This delay is needed to accommodate the power up time of the DSP, microcontroller and buffers, and thus is needed in order for the signal processing algorithms to be effective. Because of these startup delays, this type of digital noise canceling microphone is not practical for use in situations where the user turns the microphone ON and OFF after each usage, such as in push-to-talk type applications. The boot-up time of the prior art systems may be up to one second, and in critical communication microphones this delay can result in loss of valuable information. For these reasons, push-to-talk type applications and mission-critical communication applications use analog microphones in order to avoid the above-described delay.

Yet another advantage is that the microphone system of the invention is a failsafe system in terms of algorithm or signal processor failure. The prior art of digital microphones using dual microphone signal processing technology incorporates a large number of complex components, and this large number of complex components results in many failure modes. In the event of any failure, the system completely fails to operate. Prior art digital dual microphone systems may also have complex noise reduction algorithms actively working within the systems. These firmware modules can have features that may inadvertently get corrupted or malfunction dependent upon the actual acoustic environment. Analog microphones, in contrast, are fairly robust due to their simplicity. The microphone system of the invention has the option of moving into analog only mode in the event of a failure of the digital system. In the event of a digital algorithm failure, a watchdog timer may instruct the microcontroller to cross-fade the signal to the analog only path in such a way that there are no audible artifacts in the form of clicks, pops or glitches. As a result of this process, the microphone user may lose only the noise cancellation feature as the system switches back into analog only mode.

A further advantage is that the microphone system of the invention has extremely low power usage in the analog only mode. The analog microphone circuit consumes only a very small fraction of the power consumed by the digital noise cancellation-based microphone system. If the user wishes to operate the unit in this extremely low power analog mode, then the invention enables the operation to be switched back and forth between the digital mode and the analog mode without there being any audible artifacts. The cross-fading circuit may pass operation between the analog only path and the digital path without there being any audible artifact.

In summary, the invention may thus provide four distinct benefits, including instantaneous voice communications during startup; failsafe operation for algorithm failure or signal processor failure; extremely low power usage in the analog only mode; and smooth audio cross-fading while transitioning between the analog mode and the digital noise canceller mode without the presence of audible artifacts such as clicks, pops and ticking.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
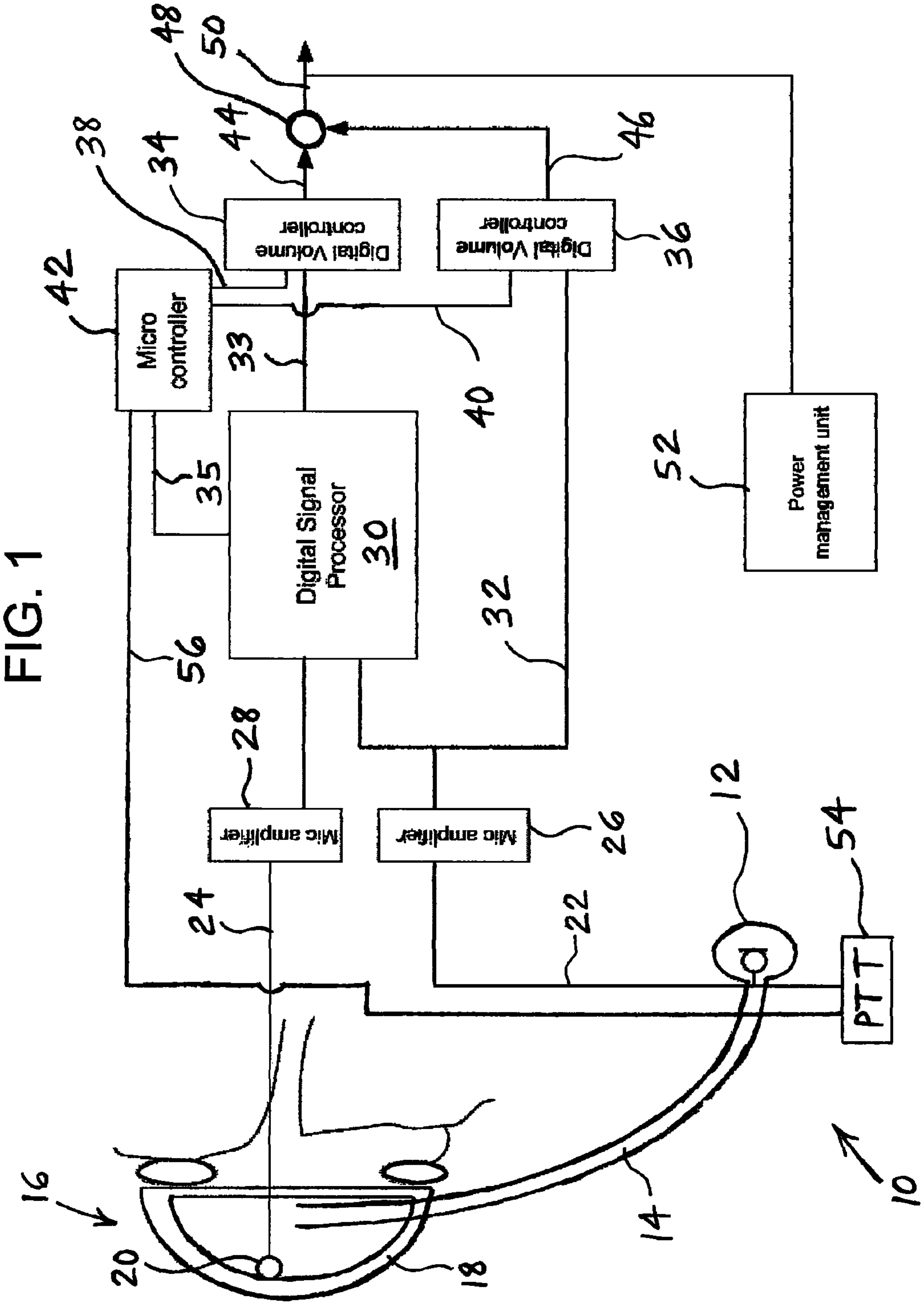
FIG. 1 is a block diagram of one embodiment of a microphone system of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring now to the drawings, and particularly to FIG. 1, there is shown one embodiment of a digital boom microphone module 10 of the present invention including a near microphone 12 for use near the user's mouth, a microphone boom 14 having an end attached to near microphone 12, and a headset 16 attached to the opposite end of boom 14. Headset 16 includes an ear cup 18 and a far microphone 20. Thus, microphones 12 and 20 are attached on opposite ends of boom 14, and may be disposed less than one foot apart from each other.

Digital boom microphone module 10 may be used in an airplane and headset 16 may be worn by a pilot, for example. As another example, digital boom microphone module 10 may be used in a football stadium and headset 16 may be worn by a coach or an announcer within the stadium.

Both the near microphone 12 and far microphone 20 produce analog signals on lines 22, 24, respectively, in response to receiving sounds. Both of these signals may be amplified by a respective one of microphone amplifiers 26, 28. After amplification, both signals may be received by digital signal processor (DSP) 30 and processed therein, as described in more detail hereinafter. However, an analog only signal originating from near microphone 12 may bypass DSP 30, as indicated at 32.

The output 33 of DSP 30 and the analog only signal at 32 may each be received at a respective one of digital volume controllers 34, 36. Another output 35 of DSP 30 may be received by a microcontroller 42. Outputs 38, 40 of microcontroller 42 are also received at digital volume controllers 34, 36, respectively.

In one embodiment, output 33 of DSP 30 is a processed signal that is essentially the digitized sum total of the outputs of amplifiers 26, 28; output 38 of microcontroller 42 is essentially twice the digitized output of amplifier 28; and output 40 of microcontroller 42 is essentially equal to the digitized output of amplifier 28. Thus, digital volume controller 34 may subtract output 38 from output 33 to arrive at an output 44 that is essentially the digitized output of near microphone 12 with any background noise captured by far microphone 20 removed. Similarly, digital volume controller 36 may subtract output 40 from output 32 to arrive at an output 46 that is essentially the digitized output of near microphone 12 with any background noise captured by far microphone 20 removed. Digital volume controller 36 may perform analog-to-digital conversion on output 32.

Outputs 44 and 46 may be summed together at 48 to produce an output 50 that is proportional to the digitized output of near microphone 12 with any background noise captured by far microphone 20 removed. This output signal 50 may be used as the microphone input signal of the intercom system (not shown). A power management unit 52 may regulate the power of output signal 50 in order to ensure that it is within an appropriate range to be received by the intercom system.

At the start up of module 10, or when a push to talk (PTT) button 54 is pressed, the analog signal path carrying output 32 may be activated and the speech signal may be pre-amplified and delivered to the intercom input at 50. Digital volume controlling cross-faders (not shown) within digital volume controllers 34, 36 may be set to pass this signal at the start up. That is, digital volume controller 36 may pass the analog-based signal at the start up before a digital-based signal is ready to be output by digital volume controller 34.

Microcontroller 42 may be directly connected to PTT button 54 via a line 56 such that microcontroller 42 may detect when PTT button 54 has been pressed. Microcontroller 42 may respond to PTT button 54 being pressed by inhibiting the audible production of a digital-based signal so long as button 54 is held in a pressed condition.

Concurrently with the analog-based signal being delivered to the intercom input at 50, DSP 30 may boot up and initiate the signal processing routine. In response to detecting that PTT button 54 has been pressed, microcontroller 42 may instruct DSP 30 via a bi-directional line 35 to boot up and initiate the signal processing routine. The digital signal processing routine may capture signals from microphones 12, 20 and perform routines to eliminate ambient noise. The far microphone signal may consist of mostly ambient noise, and the near microphone signal may be mostly speech. After both signals pass through the A/D converter and DFT modules (not shown) within DSP 30, the signals enter the adaptive transfer function identification module (not shown) within DSP 30 and the frequency domain noise cancellation based on spectral subtraction module (not shown) within DSP 30. These modules may precondition and eliminate the ambient noise on the near microphone signal based on the far microphone signal. The output from this noise cancellation module may be converted to an analog signal by a D/A converter. Once the noise canceller routine is active, the analog only path at 32 may be cross-faded (e.g., gradually reduced to near zero) by the DSP output and the two digital volume controllers 34, 36 in order to change over into noise canceling mode. In the event of a digital system failure, the watchdog system may trip and the digital-based signal may be gradually faded, powered down or moved to analog only path 32.

The above-described technique may provide a nearly instantaneous start up time and thereafter superior noise cancellation. The output 50 after the volume controlling stage may be impedance matched to suit the aircraft intercom system. The invention enables cross-fading to be performed between the digital-based signal and the analog-based signal without there being audible popping/clicking artifacts or missing voice segments.

The analog signal path at 32 is shorter timewise than the digital signal path due to the analog signal path having fewer processing elements. These additional processing elements within DSP 30 such as an A/D converter, noise canceling algorithms and the D/A converter may significantly delay the signal. For example, the signal delay may be on the order of 3-8 milliseconds depending upon the particular implementation details.

Simple cross-fading of two audio streams as in the prior art may result in an audible click or removal or duplication of a speech segment. This problem arises due to the time delay mismatch in the two audio signal paths. This problem may be solved by the present invention by using a voice activity detector (VAD) (not shown) within DSP 30. The VAD may monitor the input audio streams and perform the cross-fading only when the input signal is low. Thus, if any artifact is produced by the transition from a digital-based signal to an analog-based signal, the volume of the artifact is too low to be heard (i.e., too low to be audible). The VAD unit may use a low pass filter (not shown) to monitor the speech envelope. Alternatively, a Hilbert transform-based VAD stage may be used for accurate monitoring of the speech and non-speech transitions.

The cross-fading may be performed based on the perceptually pleasing method (e.g., by a method that provides a smooth audible transition without noticeable audible discontinuities in volume). The theoretical log domain cross-fading may be modified to implement such updated perceptually pleasing cross-fading rates.

In the event of a loss of power or a user selection to use the analog only mode, the cross-fader may revert back smoothly to the analog mode if the voice input is low. If, on the other hand, the voice input level is high, then the cross-fader may reduce the volume on both the digital channel and the analog channel and perform the cross-fading without creating audio artifacts.

In another embodiment, the analog only mode is moved into by slowly reducing the delay and performing cross-fading. The delay reduction may be achieved by using a delay buffer and reducing the buffer size when there are no speech signals. Once the buffer size is reduced to zero, a cross-fader may be used to minimize the A/D and D/A delay artifact.

Many aspects of the exact form of the cross-fading may be selectable or programmable by the user. For example, the total cross-fading time; and the exact cross-fading characteristic curves such as the log domain curve or log-like functions, and the cross-fading ramp up and down ratios may be user programmable to achieve the most perceptually smooth transition when the digital noise cancellation is starting up or turned down by the user.

Figure 2:
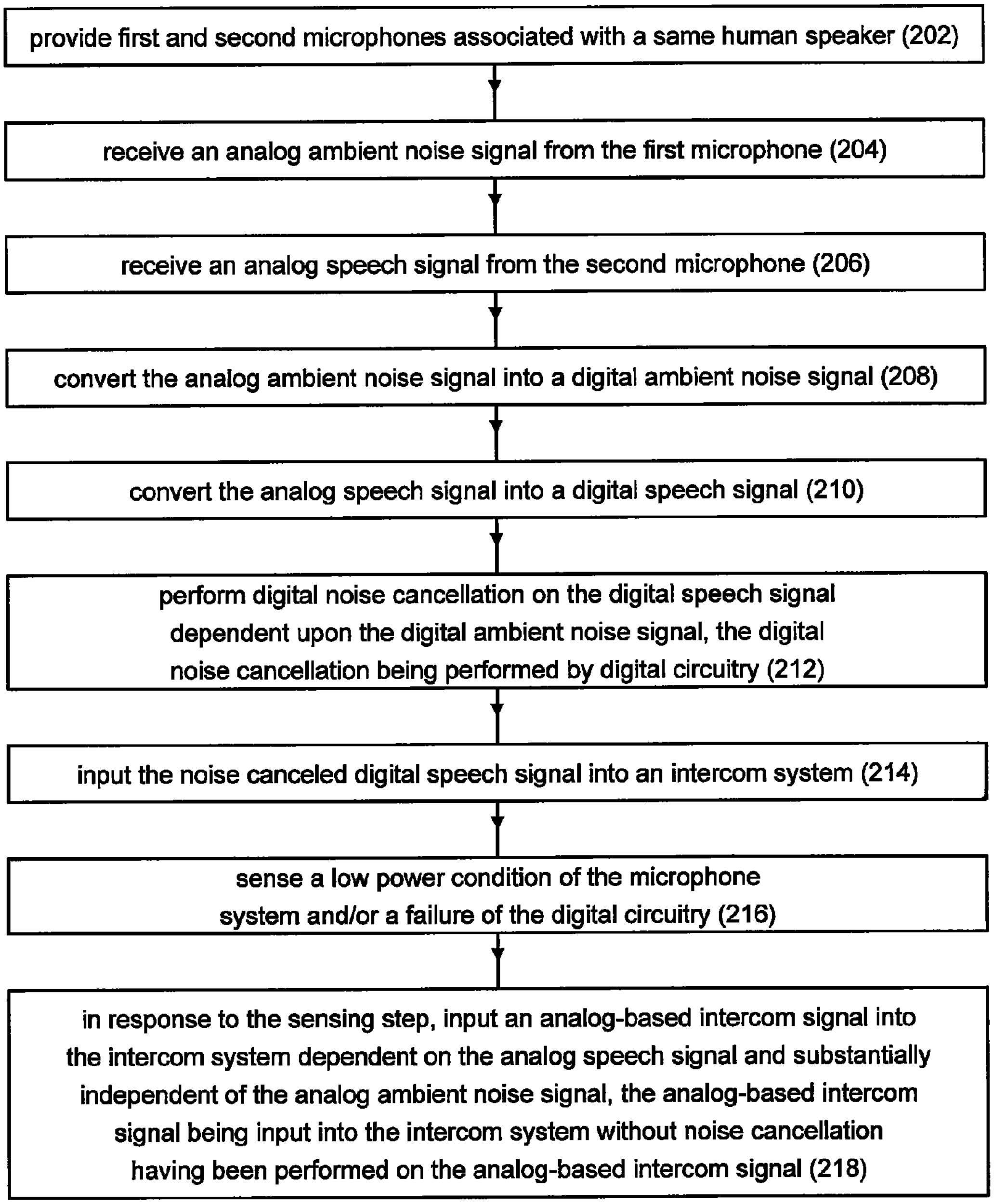
FIG. 2 is a flow chart of one embodiment of a method of the present invention for operating a microphone system.

One embodiment of a method 200 for operating a microphone system according to the present invention is illustrated in FIG. 2. In a first step 202, first and second microphones associated with a same human speaker are provided. For example, as shown in FIG. 1, a far microphone 20 and a near microphone 12 are provided on a same microphone boom 14 that is worn by a single human user.

In a next step 204, an analog ambient noise signal is received from the first microphone. That is, far microphone 20 may capture surrounding ambient noise and produce an analog ambient noise signal based thereon on line 24. The analog ambient noise signal is received by microphone amplifier 28.

Next, in step 206, an analog speech signal is received from the second microphone. That is, near microphone 12 may capture spoken sounds from a human wearer of boom 14. Near microphone 12 may also incidentally capture the same surrounding ambient noise that is captured by far microphone 20. Near microphone 12 may produce an analog speech signal on line 22 based on both the captured speech sounds from the user and the ambient noise. The analog speech signal is received by microphone amplifier 26.

Step 208 includes converting the analog ambient noise signal into a digital ambient noise signal. For example, after being amplified by microphone amplifier 28, the analog ambient noise signal may be converted into a digital ambient noise signal by an analog-to-digital converter within DSP 30.

In step 210, the analog speech signal is converted into a digital speech signal. For example, after being amplified by microphone amplifier 26, the analog speech signal may be converted into a digital speech signal by an analog-to-digital converter within DSP 30.

In a next step 212, digital noise cancellation is performed on the digital speech signal dependent upon the digital ambient noise signal. The digital noise cancellation is performed by digital circuitry. In the embodiment of FIG. 1, digital circuitry may include DSP 30, digital volume controllers 34, 36, microcontroller 42 and adder 48. This digital circuitry may perform digital noise cancellation on the digital speech signal by generally subtracting the noise signal originating from far microphone 20 from the speech plus noise signal ("digital speech signal") originating from near microphone 12. Thus, the noise is removed from the digital speech signal, leaving only the speech sound component. Before the digital noise cancellation is performed, a volume of the digital ambient noise signal and/or a volume of the digital speech signal may be adjusted such that the volume of the digital ambient noise signal is approximately equal to a noise component of the digital speech signal.

Next, in step 214, the noise canceled digital speech signal is inputted into an intercom system. For example, after the noise component is removed from the speech signal within adder 48, the noise-canceled digital speech signal is inputted into the intercom system on line 50.

In step 216, a low power condition of the microphone system and/or a failure of the digital circuitry is sensed. For example, use of the digital circuitry may need to be avoided in a low power condition or in a situation where the digital circuitry is malfunctioning. That is, the digital circuitry may use more power than is available under a low power condition, or the digital circuitry may not be able to provide input to the intercom system due to malfunctioning of the digital circuitry. The digital circuitry may include a power level detector as well as self diagnostics in order to detect a low power condition or malfunctioning of the digital circuitry. Alternatively, the power level detector and/or the digital circuitry diagnostics may be provided outside of the digital circuitry itself.

In response to the sensing step 216, in step 218 an analog-based intercom signal is inputted into the intercom system. The analog-based intercom signal is dependent on the analog speech signal and substantially independent of the analog ambient noise signal. The analog-based intercom signal is input into the intercom system without noise cancellation having been performed on the analog-based intercom signal. That is, the intercom system input signal on line 50 that results from the cross-fading is input into an intercom system that audibly broadcasts the signal to listeners within hearing distance of speakers of the intercom system. This analog-based intercom system input signal is based on the analog speech signal received in step 206, and does not include any perceptible vestige of the analog ambient noise signal received in step 204. Because the inputted analog-based signal on line 50 is based on the signal on line 32, there is no opportunity to perform noise cancellation within the digital circuitry. This non-use of the digital circuitry may be necessary because either the digital circuitry is malfunction and is unable to perform the noise cancellation, or the low power condition causes the digital circuitry to be unable to perform the noise cancellation. Thus, for this time period after failure of the digital circuitry, or after a low power condition within the digital circuitry, the signal sent to the intercom system is substantially entirely analog-based, and does not receive the benefit of digital noise cancellation, for which the digital circuitry is needed.

Figure 3:
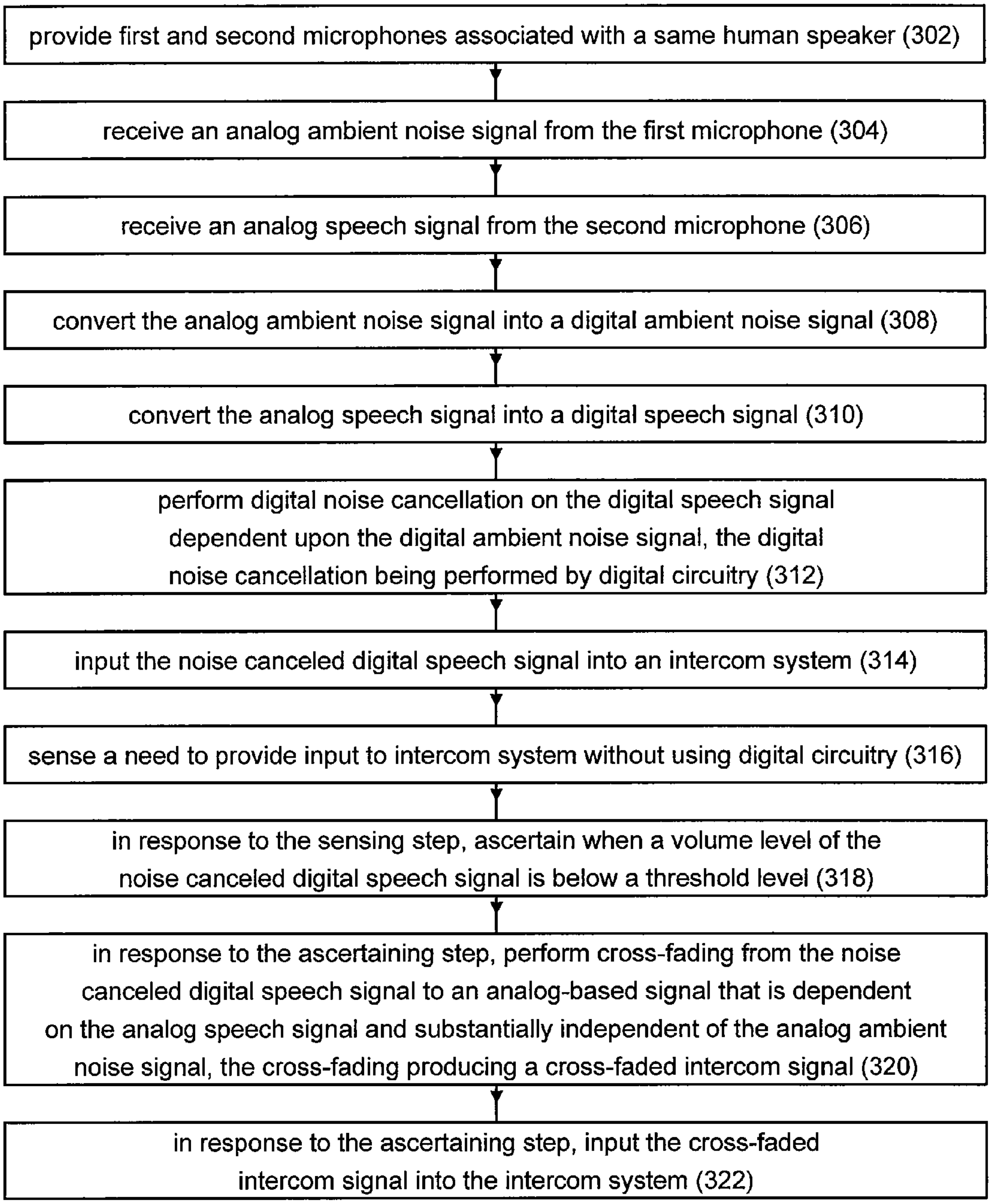
FIG. 3 is a flow chart of another embodiment of a method of the present invention for operating a microphone system.

Illustrated in FIG. 3 is another embodiment of a method 300 of the present invention for operating a microphone system. In a first step 302, first and second microphones associated with a same human speaker are provided. For example, a first microphone may be positioned to pick up background noise surrounding a particular human orator. This first microphone may be carried on the user's body, or may be installed in the vicinity of the user. A second microphone may be positioned closer to the user's mouth such that the second microphone picks up primarily speech from the user, but also picks up substantially the same surrounding background noise that is picked up by the first microphone. This second microphone may be carried on the user's body, may be a microphone the user holds close to his mouth while speaking, or may be a microphone that is supported or hung at a location such that the user may conveniently speak into the second microphone.

In a next step 304, an analog ambient noise signal is received from the first microphone. That is, the first microphone converts the ambient background noise that the microphone picks up into an electronic analog noise signal that may be carried on a wire, or may be wirelessly carried, to a signal processing arrangement that receives the signal.

Next, in step 306, an analog speech signal is received from the second microphone. That is, the second microphone converts the speech sounds uttered by the user as well as the ambient background noise that the microphone picks up into an electronic analog speech signal that may be carried on a wire, or may be wirelessly carried, to a signal processing arrangement that receives the signal.

Step 308 includes converting the analog ambient noise signal into a digital ambient noise signal. For example, the signal processing arrangement that receives the analog ambient noise signal may include an analog-to-digital converter that converts the analog ambient noise signal into a digital ambient noise signal.

In step 310, the analog speech signal is converted into a digital speech signal. For example, the signal processing arrangement that receives the analog speech signal may include an analog-to-digital converter that converts the analog speech signal into a digital speech signal including both speech and background noise.

In a next step 312, digital noise cancellation is performed on the digital speech signal dependent upon the digital ambient noise signal. The digital noise cancellation is performed by digital circuitry. For example, digital circuitry may include a DSP and a microcontroller that receive both the digital speech signal and the digital ambient noise signal. The digital circuitry may perform digital noise cancellation by generally subtracting the digital ambient noise signal from the digital speech signal (which may include both an ambient noise component and a speech sound component). Before the digital noise cancellation is performed, a volume of the digital ambient noise signal and/or a volume of the digital speech signal may be adjusted such that the volume of the digital ambient noise signal is approximately equal to a noise component of the digital speech signal.

Next, in step 314, the noise canceled digital speech signal is inputted into an intercom system. That is, the digital circuitry may input the digital speech signal (with the background noise represented by the digital ambient noise signal having been canceled out) into an intercom system on line 50.

In step 316, a need to provide input to the intercom system without using the digital circuitry is sensed. That is, microphone module 10 may automatically sense that the sound on the intercom system would be better quality if the digital circuitry were bypassed and only the analog-based signals contributed to the input into the intercom system. In one embodiment, module 10 may sense that the digital circuitry is malfunctioning, and/or that a condition is present under which the digital circuitry is likely to malfunction (or that the probability of digital malfunction is too high for continued use of the digital circuitry to be prudent). Such a condition may include falling or low supply voltages, increasing or high temperatures, high current through the digital circuitry, or decreasing quality of the signal being output by the digital circuitry, for example.

In response to the sensing step 316, in a next step 318, it is ascertained when a volume level of the noise canceled digital speech signal is below a threshold level. For example, digital volume controllers 34, 36 may detect the strength or magnitude of the intercom signal that is being output on line 50. When the signal strength or magnitude is sufficiently low, it may be an opportune time to switch to an analog signal, being that any audible artifact resulting from the switch would also be of low volume, and hence not so easily noticeable by the user. The threshold level may be a predetermined level that is selected such that any artifact, or the signal itself, is inaudible to the listeners. Alternatively, the threshold level may be a level that is relatively low compared to a sampling of other levels of the signal, such as a signal magnitude value that in the lowest one percent of all measured magnitude values.

In response to the ascertaining step 318, in step 320, cross-fading is performed from the noise canceled digital speech signal to an analog-based signal that is dependent on the analog speech signal and substantially independent of the analog ambient noise signal. The cross-fading produces a cross-faded intercom signal. For example, the signal inputted into the intercom system may initially be a pure digital signal (e.g., the noise canceled digital speech signal), or may be a mix of the noise canceled digital speech signal and an analog-based signal, with the mixture being more heavily weighted with the noise canceled digital speech signal. Regardless of the initial composition of the signal inputted to the intercom system, the cross-fading may involve gradually increasing the analog-based component of the signal and commensurately decreasing the digital-based component of the signal until the signal is substantially entirely composed of the analog-based component of the signal. This analog-based signal is based on the analog speech signal received in step 306, and does not include any perceptible vestige of the analog ambient noise signal received in step 304. This analog-based signal may be referred to herein as a “cross-faded intercom signal.”

In a final step 322, in response to the ascertaining step 318, the cross-faded intercom signal is inputted into the intercom system. That is, the analog-based signal resulting from the cross-fading in step 320 is inputted into the intercom system on line 50.

Figure 4:
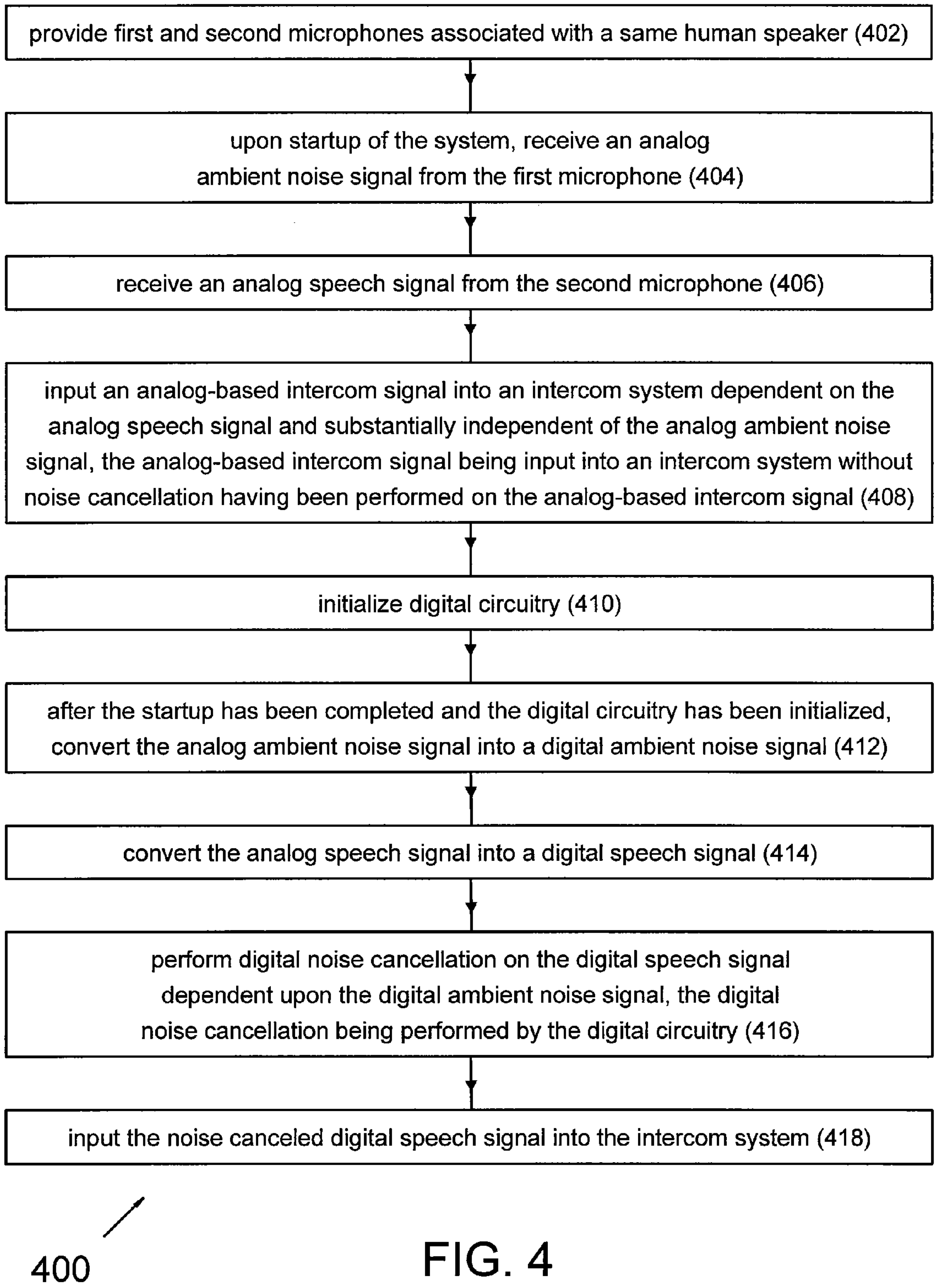
FIG. 4 is a flow chart of yet another embodiment of a method of the present invention for operating a microphone system.

Illustrated in FIG. 4 is yet another embodiment of a method 400 of the present invention for operating a microphone system. In a first step 402, first and second microphones associated with a same human speaker are provided. For example, as shown in FIG. 1, a far microphone 20 and a near microphone 12 are provided on a same microphone boom 14 that is worn by a single human user.

In a next step 404, upon startup of the system, an analog ambient noise signal is received from the first microphone. For example, when microphone module 10 is turned on (e.g., when electrical power is applied to module 10), far microphone 20 may capture surrounding ambient noise and produce an analog ambient noise signal based thereon on line 24. The analog ambient noise signal is received by microphone amplifier 28. Startup may also occur in response to the user pressing a push to talk button 54.

Next, in step 406, an analog speech signal is received from the second microphone. That is, near microphone 12 may capture spoken sounds from a human wearer of boom 14. Near microphone 12 may also incidentally capture the same surrounding ambient noise that is captured by far microphone 20. Near microphone 12 may produce an analog speech signal on line 22 based on both the captured speech sounds from the user and the ambient noise. The analog speech signal is received by microphone amplifier 26.

In step 408, an analog-based intercom signal is input into an intercom system dependent on the analog speech signal and substantially independent of the analog ambient noise signal. The analog-based intercom signal is input into the intercom system without noise cancellation having been performed on the analog-based intercom signal. That is, an analog-based signal based substantially entirely on the signal on line 32 may be inputted in the intercom system on line 50. This inputted analog-based signal on line 50 may have little or no contribution from the analog ambient noise signal captured by microphone 20. Because the inputted analog-based signal on line 50 is based on the signal on line 32, there is no opportunity to perform noise cancellation within the digital circuitry. This non-use of the digital circuitry immediately after startup may be necessary because the digital circuitry needs some time (in one embodiment, on the order of one second) in order to initialize and become ready to operate. Thus, for this short time period after startup, the signal sent to the intercom system is substantially entirely analog-based, and does not receive the benefit of digital noise cancellation, for which the digital circuitry is needed.

Next, in step 410, digital circuitry is initialized. In the embodiment of FIG. 1, digital circuitry may include DSP 30, digital volume controller 34, microcontroller 42, adder 48 and power management unit 52. As is typically of integrated circuits and digital circuitry in general, an initialization routine may be run upon startup which may include instruction sequences for performing preliminary diagnostic operations and for transferring instructions to a memory device from preselected components. When the initialization routine is complete, the components of the digital circuitry are prepared to process data inputs and operate and communicate with the other digital circuitry components.

In a next step 412, after the startup has been completed and the digital circuitry has been initialized, the analog ambient noise signal is converted into a digital ambient noise signal. That is, after a short startup time period, which may be on the order of one second in duration, and an initialization routine has been run by the digital circuitry, an analog ambient noise signal originating from far microphone 20 may be amplified by microphone amplifier 28 and converted into a digital ambient noise signal by an analog to digital converter within DSP 30.

Next, in step 414, the analog speech signal is converted into a digital speech signal. Similarly to the digital ambient noise signal, after a short startup time period, which may be on the order of one second in duration, and an initialization routine has been run by the digital circuitry, an analog speech signal (including both speech and ambient noise components) originating from near microphone 12 may be amplified by microphone amplifier 26 and converted into a digital speech signal (still including both speech and ambient noise components) by an analog to digital converter within DSP 30.

In step 416, digital noise cancellation is performed on the digital speech signal dependent upon the digital ambient noise signal. The digital noise cancellation is performed by the digital circuitry. In the embodiment of FIG. 1, digital circuitry performing the noise cancellation may include any or all of DSP 30, digital volume controllers 34, microcontroller 42, adder 48 and power management unit 52. This digital circuitry may perform digital noise cancellation on the digital speech signal by generally subtracting the noise signal originating from far microphone 20 from the speech plus noise signal ("digital speech signal") originating from near microphone 12. Thus, the noise is removed from the digital speech signal, leaving only the speech sound component. Module 10 may compensate for the different signal levels of the same background noise as captured by microphones 12, 20 such that the noise signal subtracted from the speech signal has approximately the same magnitude as the noise component of the speech signal.

In a final step 418, the noise canceled digital speech signal is inputted into the intercom system. That is, the intercom system input signal on line 50 that results from the noise cancellation performed on the digitized voice signal within DSP 30 is input into an intercom system that audibly broadcasts the signal to listeners who are disposed within hearing distance of loudspeakers of the intercom system.

Figure 5:
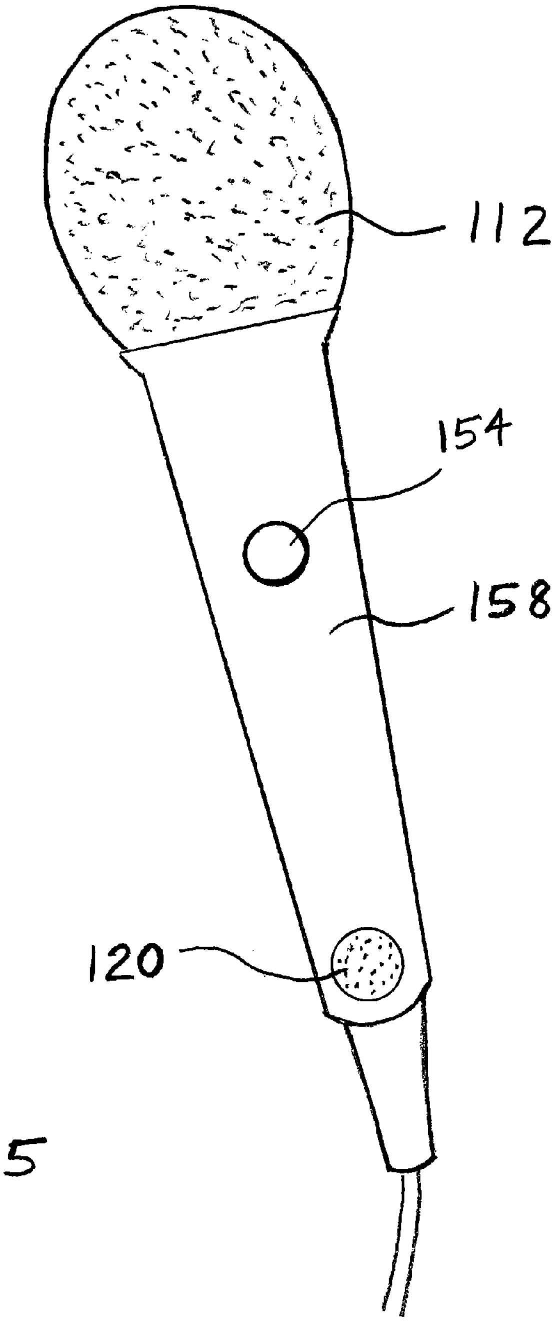
FIG. 5 is front view of a hand held microphone that may be included in a microphone system of the present invention.

FIG. 5 illustrates a hand held microphone device that may be included in a microphone system of the present invention. The device includes a near microphone 112 that the user may hold near his mouth when speaking, and a far microphone 120 that may be below his hand as the hand grips a body 158 of the device. Far microphone 120 may be directed away from the user. A push to talk button 154 on body 158 may operate substantially similarly to PTT button 54. Other aspects of the microphone system in which the microphone device of FIG. 5 is included may be substantially similar to microphone system 10, and thus are not described in detail in order to avoid needless repetition.

In the above embodiments, the near microphone may be described as receiving voice sounds, and the far microphone may be described as receiving noise sounds. However, it is to be understood that this is a simplified model of the actual operation for purposes of facilitating the explanation of the overall system. That is, the near microphone may receive both voice sounds and noise sounds, but primarily voice sounds. Similarly, the far microphone may receive both voice sounds and noise sounds, but primarily noise sounds. In some very noise environments, it is even possible within the scope of the invention for the near microphone to receive a higher level of noise sounds than voice sounds, even though the microphone is within a few inches of the wearer's mouth.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a microphone system, comprising the steps of:

providing first and second microphones associated with a same human speaker;

receiving an analog first signal from the first microphone;

receiving an analog second signal from the second microphone;

converting the analog first signal into a digital first signal;

converting the analog second signal into a digital second signal;

performing digital noise cancellation on the digital second signal dependent upon the digital first signal to generate a noise canceled digital second signal, the digital noise cancellation being performed by digital circuitry;

inputting the noise canceled digital second signal into an intercom system;

sensing a low power condition of the microphone system and/or a failure of the digital circuitry; and in response to the sensing step, inputting an analog-based intercom signal into the intercom system, the analog-based intercom signal being dependent on the analog second signal and substantially independent of the analog first signal, the analog-based intercom signal being input into the intercom system without having performed noise cancellation on the analog-based intercom signal, wherein, upon startup of the microphone system, the analog-based intercom signal is inputted into the intercom system until the digital circuitry is operable.

2. The method of claim 1 wherein the providing step includes providing the first and second microphones on opposite ends of a same boom.

3. The method of claim 1 further comprising providing a push to talk button associated with the second microphone, wherein, upon each instance of the push to talk button being pushed, the analog-based intercom signal is inputted into the intercom system until the digital circuitry is operable.

4. The method of claim 1 wherein the first and second microphones are less than one foot apart.

5. The method of claim 1 wherein the step of performing digital noise cancellation includes subtracting the digital first signal from the digital second signal.

6. The method of claim 5 wherein, before the digital noise cancellation is performed, the method includes the further step of adjusting a volume of the digital first signal and/or the digital second signal such that the volume of the digital first signal is approximately equal to a noise component of the digital second signal.

7. A method of operating a microphone system, comprising the steps of:

providing first and second microphones associated with a same human speaker;

receiving an analog ambient noise signal from the first microphone;

receiving an analog speech signal from the second microphone;

converting the analog ambient noise signal into a digital ambient noise signal;

converting the analog speech signal into a digital speech signal;

performing digital noise cancellation on the digital speech signal dependent upon the digital ambient noise signal to generate a noise canceled digital speech signal, the digital noise cancellation being performed by digital circuitry;

inputting the noise canceled digital speech signal into an intercom system;

sensing a low power condition of the microphone system and/or a failure of the digital circuitry;

in response to the sensing step, ascertaining that a volume level of the noise canceled digital speech signal is below a threshold level, the ascertaining step including detecting a strength or magnitude of the noise canceled digital speech signal; and in response to the ascertaining step:

performing cross-fading from the noise canceled digital speech signal to an analog-based signal that is dependent on the analog speech signal and substantially independent of the analog ambient noise signal, the cross-fading producing a cross-faded intercom signal; and inputting the cross-faded intercom signal into the intercom system.

8. The method of claim 7 wherein, upon startup of the microphone system, an analog-based intercom signal is inputted into the intercom system until the digital circuitry is operable.

9. The method of claim 7 wherein the step of performing cross-fading includes gradually increasing an analog-based signal component and correspondingly decreasing a noise canceled digital speech signal component of the cross-faded intercom signal.

10. The method of claim 7 further comprising providing a push to talk button associated with the second microphone, wherein, upon each instance of the push to talk button being pushed, an analog-based intercom signal is inputted into the intercom system until the digital circuitry is operable.

11. The method of claim 7 wherein the first and second microphones are less than one foot apart.

12. The method of claim 7 wherein the step of performing digital noise cancellation includes subtracting the digital ambient noise signal from the digital speech signal.

13. The method of claim 12 wherein, before the digital noise cancellation is performed, the method includes the further step of adjusting a volume of the digital ambient noise signal and/or the digital speech signal such that the volume of the digital ambient noise signal is approximately equal to a noise component of the digital speech signal.

14. A method of operating a microphone system, comprising the steps of:

providing first and second microphones associated with a same human speaker;

upon startup of the microphone system:

receiving an analog ambient noise signal from the first microphone;

receiving an analog speech signal from the second microphone;

inputting an analog-based intercom signal into an intercom system, the analog-based intercom signal being dependent on the analog speech signal and substantially independent of the analog ambient noise signal, the analog-based intercom signal being input into the intercom system without having performed noise cancellation on the analog-based intercom signal; and initializing a digital circuitry;

after the startup has been completed and the digital circuitry has been initialized:

converting the analog ambient noise signal into a digital ambient noise signal;

converting the analog speech signal into a digital speech signal;

performing digital noise cancellation on the digital speech signal dependent upon the digital ambient noise signal to generate a noise canceled digital speech signal, the digital noise cancellation being performed by the digital circuitry; and inputting the noise canceled digital speech signal into the intercom system.

15. The method of claim 14 comprising the further steps of:

sensing a low power condition of the microphone system and/or a failure of the digital circuitry; and in response to the sensing step, re-inputting the analog-based intercom signal into the intercom system dependent on the analog speech signal and substantially independent of the analog ambient noise signal, the analog-based intercom signal being input into the intercom system without having performed noise cancellation on the analog-based intercom signal.

16. The method of claim 14 wherein the providing step includes providing the first and second microphones on opposite ends of a same boom, less than one foot apart.

17. The method of claim 14 further comprising providing a push to talk button associated with the second microphone, wherein, upon each instance of the push to talk button being pushed, the analog-based intercom signal is inputted into the intercom system until the digital circuitry is operable.

18. The method of claim 14 wherein the step of performing digital noise cancellation includes subtracting the digital ambient noise signal from the digital speech signal.

19. The method of claim 18 wherein, before the digital noise cancellation is performed, the method includes the further step of adjusting a volume of the digital ambient noise signal and/or the digital speech signal such that the volume of the digital ambient noise signal is approximately equal to a noise component of the digital speech signal.

* * * * *